Feb. 20, 1962   H. L. EVERROAD   3,021,972
FILTER CLEANING DEVICE
Filed Oct. 10, 1960
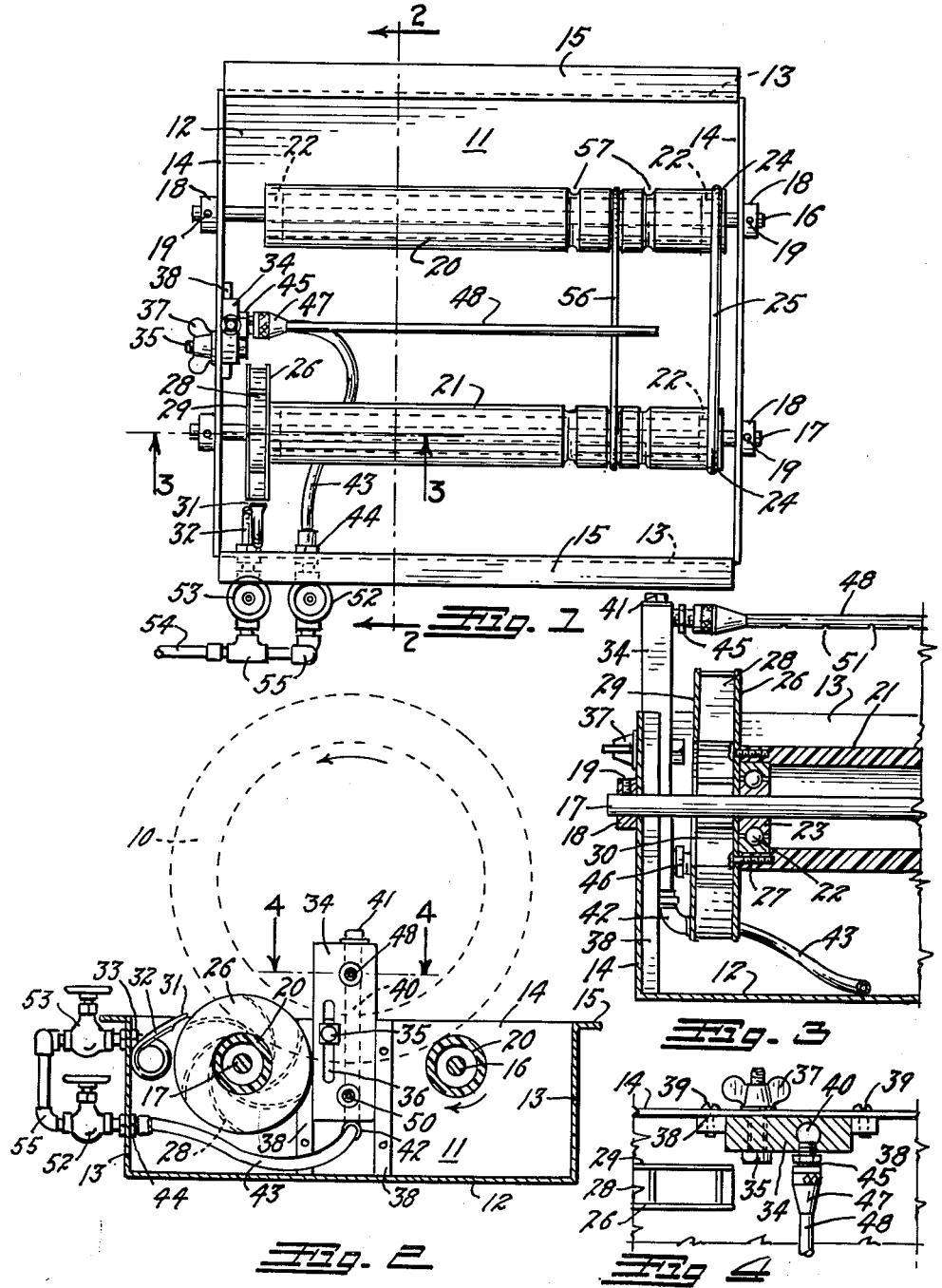
INVENTOR
HERBERT L. EVERROAD
By
ATTORNEY 3,021,972
FILTER CLEANING DEVICE
Herbert L. Everroad, Denver, Colo., assignor to Everroad Supply Co., Denver, Colo., a corporation of Colorado
Filed Oct. 10, 1960, Ser. No. 61,638
2 Claims. (Cl. 214—340)

This invention relates to a filter cleaner and more particularly to a device for cleaning the large cylindrical type of corrugated paper air filters as used on heavy industrial engine air cleaners.

Filters of the above type are hollow and cylindrical in form and are provided with relatively thick, perforated walls containing an annular packing of folded filter paper in which the foreign materials in the air flowing to the engine are entrapped. The filters are formed in a variety of differing diameters, differing lengths and differing wall thicknesses and, due to their relatively tightly-packed filter paper are exceedingly difficult to clean. As a result, cleaning is rarely attempted since it is usually more economical and less time consuming to simply replace clogged filters with new filters.

The principal object of this invention is to provide an economical highly efficient and easily used filter cleaning device by means of which the dust, sand, dirt and other debris can be quickly and efficiently removed from used filters so that the latter will be restored to their original free-air-flow-condition.

Another object of this invention is to so construct the filter cleaner that it will be adaptable for use on filters of various diameters, various lengths and various wall thicknesses.

A further object is to provide a power-actuated filter cleaner which will make use of compressed air jets for blowing foreign materials from the filters and which will also employ compressed air as a power medium for rotating the filters in the path of the jets so as to eliminate the necessity for electric motors, electrical connections, etc., so that the compressed air supply with which all service stations are supplied will serve both for cleaning the filters and for the mechanical operation of the cleaner.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

FIG. 1 is a top plan view of the improved air filter cleaner;

FIG. 2 is a cross section through the improved filter, taken on the line 2—2, FIG. 1, showing in broken line at 10 a conventional air cleaner filter in place thereon;

FIG. 3 is an enlarged fragmentary vertical section taken on the line 3—3, FIG. 1; and FIG. 4 is a similarly enlarged fragmentary section taken on the line 4—4, FIG. 2.

The improved air filter cleaner comprises a rectangular, box-like pan 11 having a closed bottom 12, two side walls 13 and two end walls 14. Outwardly projecting flanges 15 are formed along the upper edges of the two side walls 13 to support the box on any desired supporting structure, such as in rectangular opening in a work bench or rack.

The pan 11 constitutes a roller-supporting frame and two roller shafts 16 and 17 extend between and through the end walls 14 in parallel, spaced-apart relation. The shafts 16 and 17 are fixed in the end walls 14 in any desired manner such as by means of set collars 18 locked thereon by means of suitable set screws 19.

A hollow, cylindrical roller 20 surrounds the shaft 16 and a duplicate hollow, cylindrical roller 21 surrounds the shaft 17. The rollers 20 and 21 may be formed from any suitable material. They are preferably formed from relatively thick-wall plastic tubing. The rollers are rotatably mounted on their respective shafts by means of suitable, anti-friction bearings 22 fitted into the extremities of the rollers. The inner races of the bearings, shown at 23, are forced on or otherwise fixedly mounted on their respective shafts so that the rollers 20 or 21 may rotate freely about the stationary shafts. Each of the rollers is provided with a terminal belt groove 24 and a power transmission belt 25, preferably, an endless semi-elastic rubber belt, is trained about the belt grooves 24 to cause the two rollers 20 and 21 to rotate in unison.

An air turbine disc 26 is concentrically and fixedly mounted on one extremity of the roller 21 by means of attachment screws 27 or in any other desired manner. A plurality of curvated turbine blades 28 are formed on the turbine disc 26 and an annular outer disc 29, having a central air discharge opening 30, is supported by the blades 28 concentrically about the axis of the shaft 17. The discs 26 and 29 and the blades 28 form a turbine wheel for driving the roller 21.

A jet of compressed air is impinged against the blades 28 from an air nozzle 31 directed tangentially against the turbine wheel as shown in FIG. 2. The air nozzle 31 is formed on the extremity of a preferably coiled length of air tubing 32 which extends through one of the side walls 13 and is locked therein by conventional lock nuts 33 or other suitable tubing fittings.

It can be seen that an air jet directed from the nozzle 31 against the blades 28 will rotate the roller 21 and, through the medium of the belt 25, will simultaneously rotate the roller 20, and that if a conventional cylindrical air filter 10 be resting upon the rollers 20 and 21, as shown in FIG. 2, the filter will be rotated in the direction of the arrow of FIG. 2.

Means are provided for blowing jets of compressed air through the wall of the filter as it rotates. The air jet structure employs a vertically adjustable, mounting block 34 which is clamped in a vertical position against one of the end walls 14 by means of a clamp bolt 35 which extends through a vertically, elongated bolt hole 36 in the mounting block 34 and terminates in a clamp nut 37 on the exterior of the wall. The mounting block 34 is guided vertically by means of suitable guide strips 38 fixed to the inner surface of the end wall 14 in any desired manner such as by means of suitable cap screws 39.

The mounting block 34 is drilled longitudinally to provide a vertical air passage 40 which is closed at its top by means of a suitable plug 41 and which terminates at its bottom in an elbow fitting 42. A flexible hose 43 extends from the elbow fitting 42 to a suitable mounting fitting 44 in a side wall 13. Two air port openings are drilled into the block 34 to communicate with the air passage 40 in vertically-spaced relation. The openings are threaded to receive an upper tubing nipple 45 and a lower tubing nipple 46.

A coupling 47 on the extremity of an upper perforated jet tube 48 is threaded on the upper nipple 45 and a coupling 49 on the extremity of a lower, perforated jet tube 50 is threaded on the lower nipple 46. Each of the jet tubes is closed at its outer end and is provided with a plurality of spaced-apart jet openings 51 directed in a common radial direction. The jet openings in the upper jet tube 48 are directed downwardly to direct air jets downwardly against the inside of the filter 10 and the jet openings in the lower jet tube 50 are directed upwardly to direct air jets upwardly against the outside of the filter 10 so as to loosen and blow away all foreign accumulations from, on, and within the filter walls.

Air may be supplied to the air tubing 32 and the air hose 43 from a suitable source in any desired manner. As illustrated, compressed air is supplied to the flexible hose 43 through a conventional globe valve 52 and air is supplied to the air tubing 32 through a similar conventional globe valve 53. The globe valves are connected to an air supply line 54 in any desired manner and through any suitable fittings 55 so that controlled, compressed air will be supplied to the air nozzle 31 and to the jet tubes 48 and 50.

As before stated, the air filters 10 come in a variety of diameters and a variety of lengths. However, the rollers 20 and 21 will support filters of any diameter exceeding the distance between the two rollers. A smaller diameter filter will reach further downwardly between the two rollers than the larger diameter filters. This difference in vertical height of the lower portions of the filters is easily accommodated by adjusting the mounting block 34 upwardly or downwardly between its guide strips 38 and locking it in the desired position by means of the clamp nut 37. To maintain filters of various lengths in the proper longitudinal position on the jet tubes, an elastic limit belt 56 is provided which is trained around the rollers 20 and 21. The rollers are similarly formed with a plurality of spaced limit grooves 57 for receiving the limit belt 56. Thus, for short filters, the belt 56 is moved into the grooves 57 toward the mounting block 34 and for long filters, the belt is moved into grooves 57 away from the mounting block so as to maintain the filters in proper position about the jet tubes.

While, as illustrated, only one turbine wheel is employed, it is conceivable that a similar turbine structure could be applied to each of the rollers should additional power be desired. Should it be desired to use only external air jets only the lower jet tube 50 is necessary and the upper nipple 45 can be closed by a suitable cap fitting. The opposite is true where only internal air jets are desired. In the latter events, spacing of the jets from the filter can be adjusted by adjustment of the mounting block 34.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. In a pneumatic air filter cleaning device of the type having two parallel, spaced-apart, horizontal rollers for supporting an air filter in a horizontal position, means for varying the effective length of said rollers to accommodate filters of various length comprising: spaced-apart belt grooves in each roller in alignment with the belt grooves in the other roller and an endless elastic belt surrounding both rollers and being interchangeable between selected pairs of said aligned grooves to stop longitudinal travel of said air filter along said rollers at any desired point.

2. In a pneumatic filter cleaning device of the type described in claim 1, means for rotating said rollers in unison comprising: an endless power transmission belt extending from a belt groove in a first roller to a belt groove in a second roller at one extremity of both; a bladed turbine fixedly mounted on the other extremity of the first roller; and means projecting a jet of air against said turbine to rotate both rollers simultaneously.

References Cited in the file of this patent

UNITED STATES PATENTS

| | | |
|---|---|---|
| 329,847 | Nadorff | Nov. 3, 1885 |
| 1,712,751 | Cunningham | May 14, 1929 |
| 2,178,701 | Petre | Nov. 7, 1939 |
| 2,242,901 | Birch | May 20, 1941 |

FOREIGN PATENTS

| | | |
|---|---|---|
| 412,621 | Great Britain | July 2, 1934 |
| 797,940 | Great Britain | July 9, 1958 |